Dec. 19, 1922.
S. B. ARNOLD.
INTERNAL COMBUSTION ENGINE.
FILED JULY 21, 1919.
1,438,937.
2 SHEETS—SHEET 2.
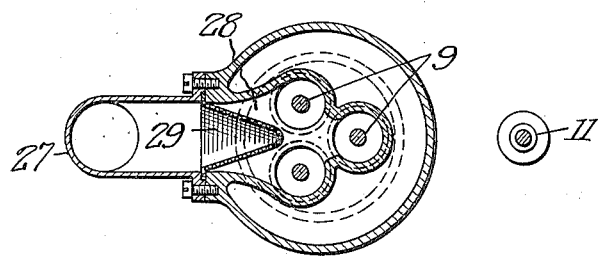
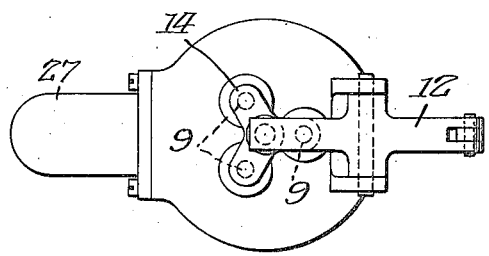
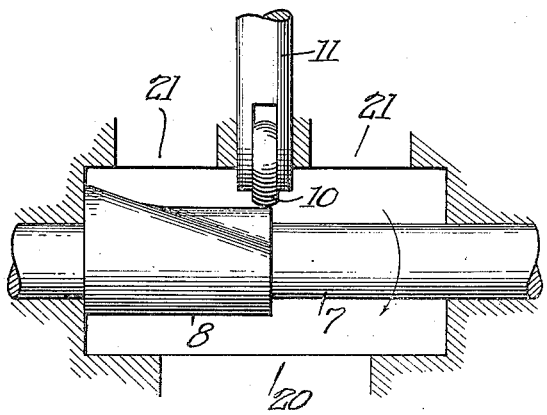
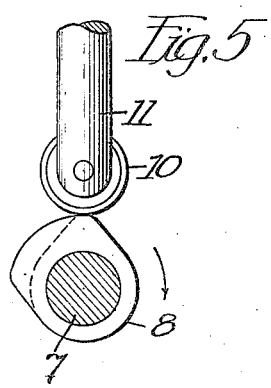
Inventor:
Stanley B. Arnold,
By G. L. Gregg atty.

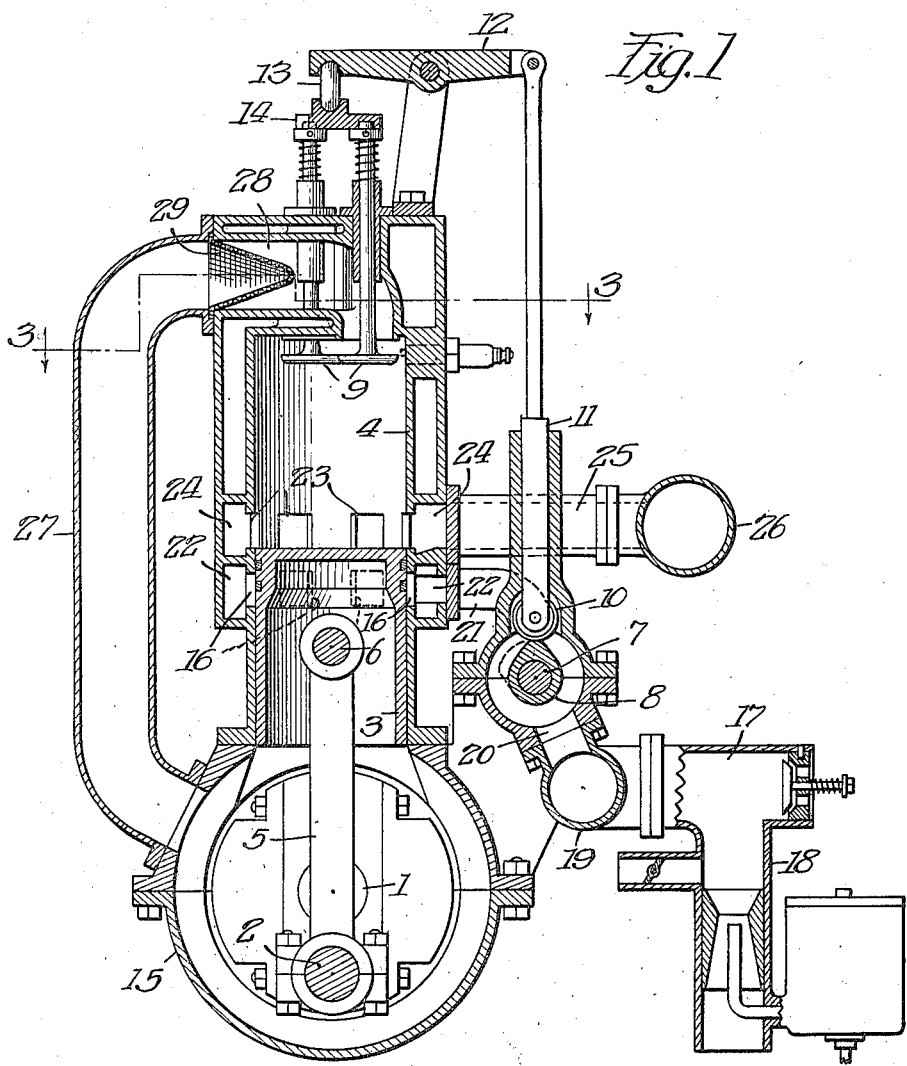
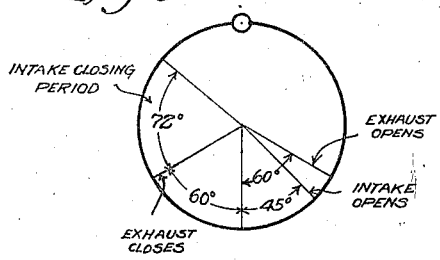

Patented Dec. 19, 1922.

1,438,937

UNITED STATES PATENT OFFICE.

STANLEY B. ARNOLD, OF CHICAGO, ILLINOIS.

INTERNAL-COMBUSTION ENGINE.

Application filed July 21, 1919. Serial No. 312,411.

*To all whom it may concern:*

Be it known that I, STANLEY B. ARNOLD, citizen of the United States, residing at Chicago, in the county of Cook and State of Illinois, have invented a certain new and useful Improvement in Internal - Combustion Engines, of which the following is a full, clear, concise, and exact description.

My invention relates to internal combustion engines of the type in which the burned gases exhaust from the engine cylinder through an exhaust port in the cylinder wall uncovered by the piston when the piston is at the end of the explosion stroke, and in which compressed air, or compressed air and gaseous fuel, enters an admission port at the end of the cylinder remote from the crank shaft when the piston has uncovered the aforesaid exhaust port, scavenging of the burned gases from the cylinder being thus effected.

The engine is, further, of the type in which a full charge of compressed air or compressed air and gaseous fuel from the crank case enters the cylinder through an admission valve for the admission port at the end of the cylinder remote from the crank shaft and consequently substantially completely exhausts the burned gases from the cylinder when the piston is at the end of its explosion stroke. This admission valve is controllable in such a manner that its time of closing can be varied with relation to the position of the piston in the cylinder so as to allow varied quantities of compressed air or compressed air and gaseous fuel to remain in the cylinder after this admission valve closes. The variable time of closing of this valve effects varied power output from the engine and varied speed of rotation of its crank shaft similar to the effect of throttling in usual types of internal combustion engines.

In engines of the type to which my invention relates, there is sure to be some mixing of the compressed air or compressed air and gaseous fuel after it has entered the cylinder with the burned gases, most of which are exhausted from the cylinder. When the time of closing of the admission valve is considerably delayed with relation to the position of the piston in the cylinder so that the engine produces comparatively little power, some of the burned gas that has remained in the cylinder will be forced back into the crank case or into the passages leading to the crank case. Thus the succeeding change of compressed air or compressed air and gaseous fuel entering the cylinder will be to some degree contaminated by burned gas and the succeeding explosion in the cylinder will be rendered less potent. When this succeeding charge has entered the cylinder it mixes with the burned gases in the cylinder as before described and consequently the proportion of burned gas mixed with it increases. When part of the contents of the cylinder is again forced back into the crank case or into the passages leading to the crank case when the piston ascends in the cylinder through the admission valve, there will be a greater proportion of burned gas forced back into the crank case or into the passages leading to the crank case than previously was so forced back, and so it is evident that as the engine continues to operate the proportion of burned gas forced back into the crank case or into the passages leading to the crank case will continue to increase. Thus the explosions will be continually and increasingly rendered less potent. This results in slowing down the engine, if the load does not change, to an approximately certain speed, after which there is no further slowing down in speed on account of the fact that the accumulation of burned gas in the compressed air or compressed air and gaseous fuel in the passages leading to the crank case and in the crank case results in less and less explosion pressure in the cylinder and consequently less and less burned gas to be exhausted therefrom. After the engine slows down sufficiently the amount of air or air and gaseous fuel entering the crank case is sufficient to keep the proportion of burned gas in the crank case and in the passages leading thereto from increasing further. Or, if the results from the accumulation of burned gas in the crank case and in the passages leading thereto are not as described above, the engine continues to slow down on account of the continued accumulation of burned gas in the crank case and in the passages leading thereto, until misfiring in the cylinder occurs, after which the engine partially clears itself of burned gas and speeds up, and this action continues as long as the operation of the engine continues. The exact results from the accumulation of burned gas in the crank case and in the passages leading thereto depend upon the design, the time of closing of the admission valve, the time of the spark, the proportions of fuel in the mixture of air and gaseous fuel in the cylinder, the nature of the fuel, etc. If the time of closing of the admission valve is not much delayed these results will probably not occur or are so serious on account of the fact that at such times the gaseous fuel contained in the end region of the cylinder remote from the crank shaft will be practically unmixed with the burned gas because practically all of the air and gaseous fuel that has become mixed with the burned gas will then be at the other end of the cylinder close to the piston and practically no burned gas will be forced back into the crank case and into the passages leading thereto. An engine of this type, if properly designed, operates successfully without a governing device so long as the engine is not operated at a low power output, but if a low power output is desired a governor should be employed.

It is serviceable to reduce the accumulation of burned gas in the crank case and in the passages leading thereto as far as possible, in order to make such an engine operate satisfactorily at a lower power output if without a governor, and if provided with a governor, to make the engine less dependent upon it for satisfactory operation at low power output and to require at such time a less amount of controlling action from the governor. It also is serviceable to reduce as far as possible the amount of burned gas that remains in the cylinder after the piston has covered the exhaust port on its compression stroke in the cylinder, even if no burned gas is forced back into the crank case or into the passages leading thereto, as higher efficiency results.

In practicing my invention I employ a plurality of valves, simultaneously operated, at the end of the cylinder remote from the crank shaft, through which valves communication between the cylinder and the crank case is established.

The accompanying drawings illustrate a cylinder of an engine embracing the preferred embodiment of my invention. The engine is of the two stroke cycle type, by which I mean that in each cylinder a cycle is completed every two strokes of the piston.

In the drawings Fig. 1 is a view, mainly in cross section, of the engine; Fig. 2 is a view looking down upon the engine head; Fig. 3 is a view in section on line 3—3 of Fig. 1; Fig. 4 is a side view of a valve controlling cam mechanism; Fig. 5 is an end view of the valve controlling cam mechanism shown in Fig. 4; and Fig. 6 is a diagram of the cycle of operations.

Like parts are indicated by similar characters of reference throughout the different figures.

As crank shaft 1 and crank 2 rotate, piston 3 is caused to ascend in cylinder 4 by means of connecting rod 5 and gudgeon pin 6. As the crank shaft 1 rotates, the cam shaft 7, on which is placed the cam 8, is rotated by means of suitable gearing or other positive mechanical connection (not shown) with crank shaft 1 in the same direction as crank shaft 1 and at the same speed, said gearing or other positive mechanical connection effecting positive rotative connection but allowing relative longitudinal movement between the cam shaft 7 and the cam 8 and cam roller 10. Cam 8 controls the opening and closing of intake valves 9 by means of the cam roller 10, pushrod 11, tappet 12, connector link 13 and spider piece 14. Cam 8 is so made that the face by which it opens the intake valves 9 is straight but the face by which it allows the intake valves 9 to close is on a slant around the cam. Consequently the time of opening of the intake valves 9 relatively to the position of the piston 3 in the cylinder 4 does not change regardless of the longitudinal position of the cam shaft 7 and cam 8 with relation to cam roller 10. But when cam shaft 7 and cam 8 are moved longitudinally to the right, relatively to cam roller 10 in Fig. 4, the time of closing of intake valves 9 is delayed, but when cam shaft 7 and cam 8 are in their extreme right hand position relatively to cam roller 10 a very considerable amount of delay in the closing of intake valves 9 is effected. For the present cam shaft 7 and cam 8 will be considered as being at the left hand limit of their longitudinal piston, relatively to cam roller 10, as shown in Fig. 4. Thus when piston 1 has ascended but a short distance in cylinder 4 cam shaft 7 and cam 8 have rotated sufficiently to allow the intake valves 9 to close, with the result that when the piston 1 continues to ascend in cylinder 4 a vacuum is created in the crank case 15. Each crank case in the engine is a separate closed chamber, and, with the working parts enclosed in it, is designed to economize on empty space. When piston 3 ascends and uncovers the intake port 16, fuel and oil and air mixture rush from the mixing chamber 17 of the carburetor 18 and through the intake manifold 19 and port 20 and around the cam shaft 7 and cam 8 and through passages 21 and annular chamber 22, through intake ports 16 and so into the cylinder 4 below the piston 3 and crank case 15.

In this engine lubrication is accomplished by mixing lubricating oil with the fuel and passing the resulting mixture of lubricating oil and fuel through the carburetor 18. By passing the fuel and oil and air mixture around the cam shaft 8 and cam 8, I effect thorough lubrication of these and the adjoining parts.

When the piston 3 descends in the cylinder 4 and covers the intake ports 16, the fuel and oil and air mixture in the cylinder 4 below the piston 3 and in the crank case 15 is compressed. When the piston 3 descends in the cylinder 4, an explosion is taking place, as later explained, in the cylinder 4 above the piston 3. The piston 3 descends in the cylinder 4 and uncovers the exhaust ports 23 when at the limit of its ascent in the cylinder 4 and most of the burned gases in the cylinder rush out of the exhaust ports 23 and annular chamber 24 and exhaust passage 25 and so into the exhaust manifold 26 and from there to the outside atmosphere. Shortly after the piston 3 begins to uncover the exhaust ports 23, the intake valves 9 are opened by cam 8 which has rotated sufficiently to accomplish this result. The interior of the crank case 15 is connected by the tube 27 with the intake passage 28 in the head of the cylinder 4. Wire gauze cone 29 is placed in the intake passage 28. Thus when the intake valves 9 are opened by cam 8, most of the compressed fuel and oil and air mixture in the crank case 15 and cylinder 4 below the piston 3 rushes through the tube 27 and wire gauze cone 29 and the intake passage 28 and past the intake valves 9 into the cylinder 4 above the piston 3. The fuel and oil and air mixture thus entering the cylinder 4 above the piston 3 fills that end of the cylinder 4, forcing practically all of the residue of burned gases that was left in the cylinder 4 above the piston 3 out of the cylinder 4 through the exhaust ports 23.

Piston 3 now ascends and covers the exhaust ports 23. Cam 8 rotates as the piston 3 ascends in the cylinder 4 and allows the intake valves 9 to close at about the same instant as that at which the piston 3 covers the exhaust ports 23. When the piston 3 continues to ascend in the cylinder 4, it compresses the fuel and oil and air mixture that is contained in the cylinder 4 above the piston 3, and when the piston 3 is near the upper limit of its ascent in the cylinder 4 the now highly compressed fuel and oil and air mixture in the cylinder 4 above the piston 3 is ignited. I have now explained how an explosion takes place in the cylinder 4 above the piston 3 when the piston 3 descends in the cylinder 4 and I have described so far the operation of the engine when running with no delay in the time of closing of the intake valves 9. I shall now describe the method of effecting lesser power output from the engine and lesser speed of rotation of its crank shaft while effecting substantially complete scavenging of the burned gases from its cylinder at all times.

The cam shaft 7, as I have previously described, is so made that it can be moved longitudinally while at all times retaining its rotative connection with the crank shaft 1. This moving of the cam shaft 7 longitudinally can be effected manually or by using energy supplied by the engine or by some outside source. A speed governing device either actuated by the engine or not so actuated can be used to move the cam shaft 7 longitudinally, although I have not shown a governing device in my drawings. The time of opening of the intake valves 9 relatively to the position of the piston 3 in the cylinder 4, as I have previously described, does not change, irrespective of the longitudinal position of the cam shaft 7 and cam 8 with relation to the cam roller 10, but when the cam shaft 7 and cam 8 are moved longitudinally to the right, with relation to the cam roller 10, the time of closing of the intake valves 9 relatively to the position of the piston 3 in the cylinder 4 is delayed, the amount of delay depending upon the distance that the cam shaft 7 and cam 8 are moved to the right, with relation to the cam roller 10.

Fig. 6 shows the valve and port opening and closing diagrammatically as I have designed this engine. In Fig. 6 the piston begins to uncover the exhaust ports when the crank is sixty degrees before the lower center. The intake valves begin to open when the crank is forty-five degrees before the lower center. The piston completely covers the exhaust ports when the crank is sixty degrees beyond the lower center. The time of complete closing of the intake valves varies from the same instant as that at which the piston completely covers the exhaust ports, which is when the crank is sixty degrees beyond the lower center, to an instant when the crank has rotated seventy-two degrees farther toward the upper center.

The result of moving the cam shaft 7 and cam 8 to the right, with relation to the cam roller 10, and so delaying the time of closing of the intake valves 9 is that when the piston 3 ascends in the cylinder 4, after covering the exhaust ports 23, it forces the fuel and oil and air mixture contained in the cylinder 4 above the piston 3 back past the intake valves 9 and through the intake passage 28 and wire gauze cone 29 and tube 27 and so back toward the interior of the crank case 15, thus relieving the vacuum that would otherwise be created therein by the ascent of the piston 3 in the cylinder 4. This forcing of the fuel and oil and air mixture back toward the interior of the crank case 15 continues until the intake valves 9 close, which time depends upon the longitudinal position of the cam shaft 7 and cam 8 relatively to cam roller 10, after which time the piston 3 compresses the fuel and oil and air mixture contained in the cylinder 4 above the piston 3 and creates a vacuum in the cylinder 4 below the piston 3 and in the crank case 15.

It is evident that by moving the cam shaft 7 and cam 8 to the right or left relatively to cam roller 10, I vary the amount of the fuel and oil and air mixture passing through this engine, effecting varied power output from the engine and varied speed of rotation of its crank shaft, similar to the effect of throttling in usual types of internal combustion engines, and also that I effect substantially complete scavenging of the burned gases from its cylinder at all times.

The reason for placing wire gauze cone 29 in the intake passage 28 is to prevent ignition of the fuel and oil and air mixture in the tube 27 and in the crank case 15 if there should be danger otherwise at any time of such ignition on account of a slow burning charge of fuel and oil and air mixture in the cylinder from a relatively small amount of fuel in the mixture, a late time of spark, and various other reasons.

The method of mixing lubricating oil with the fuel is the preferred method of lubricating this engine, although other methods could be used. It is advantageous on account of simplicity.

The timing of the valves and port opening and closing can be different from that shown in Fig. 6, as the designer of the engine desires, although the timing shown is satisfactory for purposes of explanation.

The invention and novelty in this engine consists in the use of the plurality of intake valves 9, simultaneously operated, instead of the use of a single valve in their place. A single intake valve could be used at the end of the cylinder 4, but in order to provide sufficient area of opening past it, without objectionably great lift, it would necessarily be of considerable diameter, relatively to the diameter of the cylinder 4. When the intake valve was opened and the compressed fuel and oil and air mixture passed by it and entered the cylinder 4, the compressed fuel and oil and air mixture would flow to considerable degree radially outward from the intake valve until it came into contact with the wall of the cylinder 4, when it would turn and flow through the cylinder 4 toward the exhaust ports 23. As it flowed toward the exhaust ports 23, it would tend to stay close to the wall of the cylinder 4 until it had gone considerable distance toward the exhaust ports 23, and would then gradually converge toward the center of the cylinder 4. Thus there would be left under the head of the intake valve an approximately cone-shaped volume of burned gas which would not be exhausted from the cylinder 4 through the exhaust ports 23 by the compressed fuel and oil and air mixture entering the cylinder past the intake valve. And as the quantity of compressed fuel and oil and air mixture entering the cylinder 4 is, as I have previously described, at all times the same and sufficient to fill the cylinder as far as the exhaust ports 23, part of the fuel and oil and air mixture that entered the cylinder 4 past the intake valve would be forced out of the cylinder 4 through the exhaust ports 23. Thus thermal efficiency and loss of power in the operation of the engine would result. And also, at times when the engine was being operated with the time of closing of the intake valve delayed, as when low power output from the engine and low speed of rotation of its crank shaft was desired, the approximately cone-shaped volume of burned gas would be considerably broken up when the piston ascended in the cylinder 4 and covered the exhaust ports 23 with the results that much of the burned gas from under the intake valve would be forced past the intake valve through the intake passage 28, wire gauze cone 29 and tube 27 toward the crank case 15. This forcing of burned gas from the cylinder 4 above the piston 3 past the intake valve and toward the crank case would contaminate the succeeding charges of fuel and oil and air mixture entering the cylinder 4 and produce the undesirable results that I described previously to describing the operation of the engine in detail.

By the use of the plurality of simultaneously operated intake valves 9, I greatly reduce the amount of the undesirable results resulting from the use of a single intake valve in their place, because I secure the same or greater area of opening between the intake passage 28 and the interior of the cylinder 4 above the piston 3, without objectionably great lift of the intake valves 9 while reducing the total intake valve head area at the head of the cylinder 4. This is on account of the geometrical principle that the areas of circles are to each other as the squares of their circumferences. Thus if I retain the same total circumferential distance in the three intake valves 9 that I show in the drawings of my engine as I should have in a single large intake valve, the area of each of the three intake valves 9 would be one-ninth that of the single large intake valve and their total area would be one-third of the area of the single large intake valve. Also, on account of the relatively small diameter and small area of each of the three intake valves, the length of the approximately cone-shaped mass of burned gas remaining under each intake valve 9 when the compressed fuel and oil and air mixture entered the cylinder 4 above the piston 3 past the intake valves 9 would be much less than in the case of the single large intake valve, and consequently the total volume of the approximately cone-shaped masses of burned gas remaining under intake valves 9 and so in the cylinder 4 above the piston 3 when the piston 3 ascends in the cylinder 4 and covers the exhaust ports 23 would be very much less than the volume of burned gas remaining in the cylinder 4 at that time if a single large intake valve were used. Also, in using the plurality of simultaneously operated intake valves 9, the flow of compressed fuel and oil and air mixture from each intake valve 9 interferes with the flow from each of the other intake valves 9 in such manner as to tend to prevent, to a considerable degree, the approximately cone-shaped volumes of burned gas from forming under each intake valve 9 when the compressed fuel and oil and air mixture enters the cylinder 4 above the piston 3 past the intake valves 9. Thus there is positive advantage and distinct invention in the use, in engines of the type referred to, of a plurality of simultaneously operated intake valves 9.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. A two stroke cycle internal combustion engine including a gas receiving crank case; a cylinder in communication with said crank case; a piston operating in said cylinder; means for permitting flow of gas to and obstructing flow of gas from the crank case; a plurality of engine operated simultaneously operating valves at the end of the cylinder remote from the crank case for permitting and obstructing flow of gas between the crank case and the combustion end region of the cylinder; and means for varying the time of closure of said valves with respect to the position of the piston within the cylinder, there being an exhaust port in the cylinder opened and closed by the piston.

2. A two stroke cycle internal combustion engine including a cylinder; a piston operating said cylinder; means for compressing gas previous to its admission to the combustion end region of the cylinder; a plurality of engine operated simultaneously operating valves at the combustion end of the cylinder for permitting and obstructing flow of compressed gas into and out of the combustion end region of the cylinder; and means for varying the time of closure of said valves with respect to the position of the piston within the cylinder, there being an exhaust port opened and closed by the piston.

In witness whereof, I hereunto subscribe my name this eighteenth day of June A. D., 1919.

STANLEY B. ARNOLD.